G. L. KINSER.
HEAD GATE FOR IRRIGATION DITCHES.
APPLICATION FILED JULY 24, 1909.
950,138.
Patented Feb. 22, 1910.
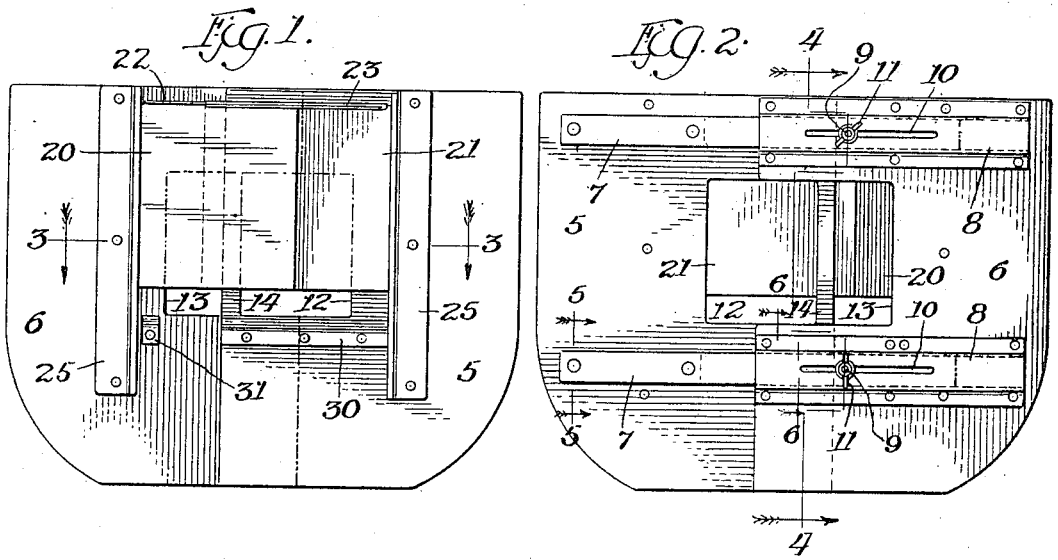
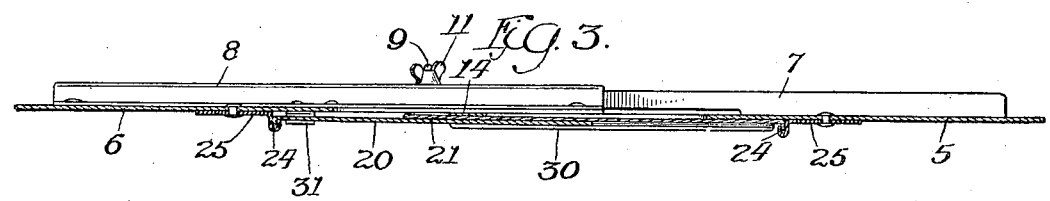
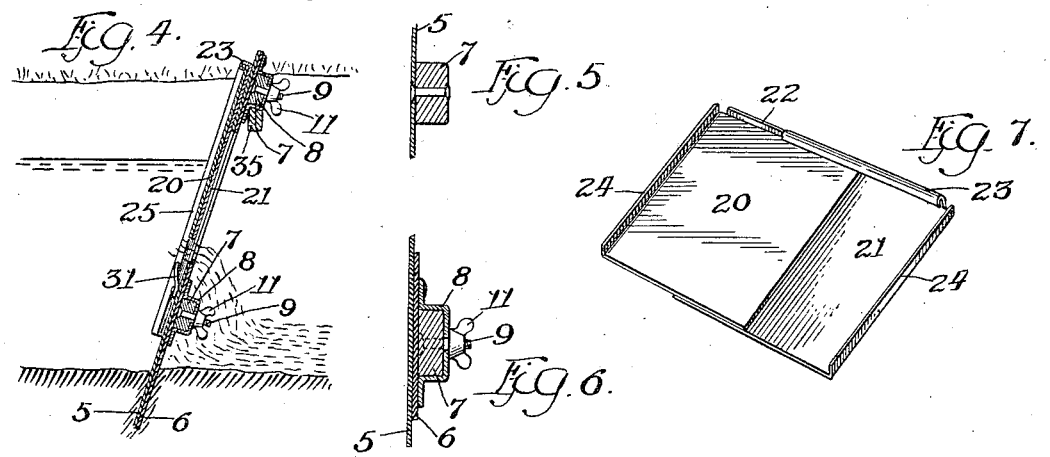
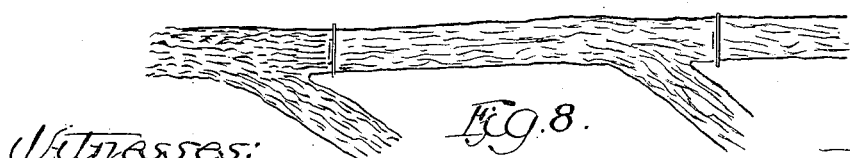
Witnesses:
Inventor:
George L. Kinser
by Poole & Browne
Attys

UNITED STATES PATENT OFFICE.

GEORGE L. KINSER, OF AURORA, ILLINOIS.

HEAD-GATE FOR IRRIGATION-DITCHES.

950,138. Specification of Letters Patent. Patented Feb. 22, 1910.

Application filed July 24, 1909. Serial No. 509,269.

*To all whom it may concern:*

Be it known that I, GEORGE L. KINSER, a citizen of the United States, and a resident of Aurora, in the county of Kane and State of Illinois, have invented certain new and useful Improvements in Head-Gates for Irrigation-Ditches; and I, GEORGE L. KINSER, do hereby declare that the following is a full, clear, and exact description thereof, reference being had to the accompanying drawings, and to the numerals of reference marked thereon, which form a part of this specification.

This invention relates to improvements in head gates for irrigation ditches and has for its object to provide a gate of this character which may be adjusted transversely of the ditch and which is provided with an adjustable opening adapted to be closed or opened to regulate the flow of water through the head gate.

The invention consists in the matters hereinafter set forth and more particularly pointed out in the appended claims.

In the drawings illustrating this invention:—Figure 1 is a view in elevation of the up stream side of the gate. Fig. 2 is a view in elevation of the down stream side of the gate. Fig. 3 is an enlarged detail sectional view, taken upon line 3—3 of Fig. 1. Fig. 4 is a detail sectional view, taken upon the irregular line 4—4 of Fig. 2. Fig. 5 is a detail sectional view, taken upon line 5—5 of Fig. 2. Fig. 6 is a detail sectional view, taken upon line 6—6 of Fig. 2. Fig. 7 is a perspective view of the auxiliary gates. Fig. 8 is a plan view of an irrigation ditch showing my improved gate in use.

The body portion of the gate consists of two sections 5 and 6 which are adjustably secured together to permit lateral adjustment of said gate. As shown, there are secured to the section 5 two horizontally arranged bars 7, 7 which fit and slide in horizontally arranged ways or guides 8, 8 secured to the section 6. Said bars and guides are preferably secured to the respective gate sections by means of rivets or bolts. Attached to each of the bars 7 is a bolt 9 which extends outwardly through a slot 10 in its guide 8 and which receives a wing nut 11 adapted to clamp the two gate sections together in any position of their adjustment. Adjacent to its inner margin the section 5 is provided with an opening 12 which is horizontally in line with a cut away part 13 formed in the inner margin of the section 6, the two forming an adjustable opening through the body of the gate through which water may pass. A strip 14 separating the opening 12 from the inner margin of the section 5 serves as a brace for an auxiliary gate to be hereinafter described. Each of the sections 5 and 6 is rounded off at its lower outside corner to permit the gate to be more readily inserted between the banks of the ditch.

Referring now to the means for controlling the flow of water through the opening in the central portion of the gate, this embraces an auxiliary gate formed in two sections 20 and 21. As shown in the drawings, the said sections 20 and 21 are adjustably secured together, as clearly to be seen in Fig. 7, there being formed upon the upper margin of the section 20 a flange 22 which fits and slides within a guide 23 formed upon the upper margin of the section 21. At their outer margins each of the sections 20 and 21 is bent at right angles to form an outwardly extending flange 24 which engages within a groove formed in a vertically arranged supporting strip 25 secured to the gate section. As will be seen from this construction, the auxiliary gate is not only movable vertically to permit the water to flow through the adjustable opening, but is laterally adjustable with the gate sections 5 and 6, thus effectively closing the adjustable opening in any position of adjustment of said sections 5 and 6. The auxiliary gate is placed upon the up-stream side of the head gate and is braced by means of the strip 14 when the gate sections 5 and 6 are drawn out to fit a wider ditch. Retaining members 30 and 31 secured to the sections 5 and 6 just below the lower margins of the openings therein, engage the lower end of the auxiliary gate when it is closed.

The head gate is inserted into the ditch at the point desired by pressing the margins thereof into the earth of the banks and bottom of said ditch. It is preferable, in the use of the gate, to insert transversely of the ditch a brace rod 35 (Fig. 4) against which the down-stream side of the gate bears.

The advantages of a head gate embodying the features of my invention are apparent, it being manifest that such a gate can be applied to ditches of different widths within certain limits and the adjustability, both laterally and vertically, of the auxiliary gate controlling the adjustable opening, enables the user to regulate the flow of water therethrough to any desired quantity. Moreover, such a head gate may be easily and cheaply manufactured and is of durable construction.

I claim as my invention:—

1. In a head gate for irrigation ditches, a body comprising two transversely adjustable sections, said body being provided with an adjustable opening and an auxiliary gate adapted to close said opening, said auxiliary gate comprising sections adjustable with the body sections.

2. In a head gate for irrigation ditches, a body comprising two transversely adjustable sections, said body being provided with an adjustable opening, an auxiliary gate adapted to close said opening, said auxiliary gate comprising sections adjustable with the body sections and locking means for said body sections.

3. In a head gate for irrigation ditches, a body comprising two transversely adjustable sections each provided at its inner margin with an opening, and an auxiliary gate adapted to cover said openings in any position of adjustment of the body sections, said auxiliary gate comprising two sections transversely adjustable with said body sections, and vertically adjustable with respect thereto.

4. In a head gate for irrigation ditches, a body comprising two transversely adjustable sections each provided at its inner margin with an opening, an auxiliary gate adapted to cover said openings in any position of adjustment of the body sections, said auxiliary gate comprising two sections transversely adjustable with said body sections, and vertically adjustable with respect thereto, and means for locking said body sections in any position of their adjustment.

5. In a head gate for irrigation ditches, a body comprising two transversely adjustable sections, each provided at its inner margin with an opening, an auxiliary gate adapted to close said openings, said auxiliary gate comprising two sections, one of said sections being provided on its upper margin with a guide and the other of said sections being provided at its upper margin with a flange which fits and slides within said guide on the first named section, each of said auxiliary gate sections being also provided on its outer margin with a flange, and vertically arranged retaining strips secured to said body sections, said strips being slidably engaged by the flanges at the sides of said auxiliary gate sections.

In testimony, that I, Geo. L. Kinser, claim the foregoing as my own invention I affix my signature in the presence of two witnesses, this seventeenth day of July A. D. 1909.

GEORGE L. KINSER.

Witnesses:
J. C. Martin,
G. M. Hem.